(12) United States Patent
Paulsen et al.

(10) Patent No.: US 8,843,146 B2
(45) Date of Patent: Sep. 23, 2014

(54) METHOD OF CONTROLLING A COMMUNICATIONS CHANNEL

(75) Inventors: Christian Paulsen, Dyssegard (DK); Erling Skjoldborg, Kgs. Lyngby (DK)

(73) Assignee: GN Netcom A/S (DK)

( * ) Notice: Subject to any disclaimer, the term of this patent is extended or adjusted under 35 U.S.C. 154(b) by 0 days.

(21) Appl. No.: 13/521,650

(22) PCT Filed: Jan. 14, 2011

(86) PCT No.: PCT/EP2011/050466
§ 371 (c)(1),
(2), (4) Date: Jul. 11, 2012

(87) PCT Pub. No.: WO2011/086159
PCT Pub. Date: Jul. 21, 2011

(65) Prior Publication Data
US 2012/0329469 A1    Dec. 27, 2012

Related U.S. Application Data

(60) Provisional application No. 61/295,254, filed on Jan. 15, 2010.

(51) Int. Cl.
*H04W 72/04* (2009.01)
*H04W 52/02* (2009.01)

(52) U.S. Cl.
CPC .............................. *H04W 52/0235* (2013.01)
USPC ........................................ 455/450; 455/422.1

(58) Field of Classification Search
USPC .......................... 455/450–452.2; 370/229–235
See application file for complete search history.

(56) References Cited

U.S. PATENT DOCUMENTS 6,047,176 A * 4/2000 Sakamoto et al. ......... 455/422.1

FOREIGN PATENT DOCUMENTS

| EP | 0769885 | 4/1997 |
|---|---|---|
| EP | 1613038 | 1/2006 |
| WO | WO 2009/070415 | 6/2009 |
| WO | WO 2009070415 | 6/2009 |

OTHER PUBLICATIONS

English translation of Office Action dated Dec. 5, 2013 for Chinese Application No. 201180014040.6.

* cited by examiner

*Primary Examiner* — Kashif Siddiqui
(74) *Attorney, Agent, or Firm* — Altera Law Group, LLC

(57) ABSTRACT

A method of controlling a communications channel, comprising: receiving a real time digital signal; processing the real time digital signal to provide a control signal; and controlling the base station in response to the control signal. Where the processing comprises in succeeding time slots determining whether predefined signal content is present in the real time digital signal, increasing or decreasing a first value when predefined signal content is present and, respectively, decreasing or increasing the first value when predefined signal content is not present, and changing the control signal when the first value reaches a first target value. The method also relates to controlling a base station for a headset, where the base station and headset communicates via a wireless connection and where the base station communicates with a PC via a wired interface e.g. a USB interface.

17 Claims, 4 Drawing Sheets

METHOD OF CONTROLLING A COMMUNICATIONS CHANNEL

A communications channel may comprise a chain of communication links. At a point between an upstream link and a downstream link a base station interconnects the links and controls the downstream link. As a part of the controlling, the base station may issue a signal to open or close the downstream link e.g. for the purpose of saving power. However, there may be a significant delay from the issue of the signal to open or close the downstream link and until the opening or closing of the link is brought into effect. The delay may be caused by physical signal propagation delays, activation of electrical circuits and/or protocol negotiation procedures.

Data may arrive in realtime or nearly realtime from the upstream link to the downstream link also when the downstream link is closed. If the downstream link is closed when data arrives from the upstream link, the base station has to open the downstream link.

The base station may be a base station for headset that is connected to a general purpose computer via a wired connection e.g. according to the Universal Serial Bus, USB, standard and has wireless communications means e.g. a radio circuit for communicating with a headset with a compatible radio circuit. The radio circuit may be according to the DECT or Bluetooth® standard. Data sent from the general purpose computer to the base station comprises audio data which are supposed to be played through a speaker of the headset. However, it is a problem that the general purpose computer does not give a specific warning in advance of audio data being sent to the base station. The base station therefore cannot activate the link to the headset well in advance to secure that all audio data can be sent to the headset while ensuring that power is conserved.

Typically power in the headset is conserved since it can take a power saving mode when the base station indicates this to the headset or, contrary, it can take normal power consuming state when the base station indicates this. Typically, the headset is operated by small batteries with limited capacity in order to meet demands to weight and volume of the headset.

On the one hand, as it takes time to establish a radio audio link to a wireless headset it is important not to instantaneously initiate opening of the audio link when short sounds are played from the general purpose computer, because due to the delay, the sound will be finished before the audio link is established. On the other hand, if the link is opened late a significant portion of the audio signal is lost. For power saving reasons it is important not to keep the audio open too long, however the audio link should not be closed in the middle of an audio transmission from the computer to the headset as this will cause interruptions that severely will degrade the quality of the transmitted audio.

For the sake of completeness, the headset also has a microphone for picking up audio and transmitting it the reverse way to the computer. In particular the above considerations apply to telephonic use of the base station and headset since then buffers to capture otherwise lost part of the audio transmission will introduce unacceptable delays, which will seriously degrade quality of the whole telephone connection.

RELATED PRIOR ART

A prior art method for operating a base station is to open a wireless audio link to a headset when audio have been present in 1.6 seconds without pauses and, conversely, to close the wireless audio link when audio have been not present for 6 consecutive seconds.

However, this method is inconvenient in special situations, which nevertheless may occur frequently, since sounds as a means for signalling are being employed more extensively and in various ways. In these situations the audio link may remain open longer than appropriate and thus consume too much power or remain closed and thus resulting in a loss of relevant audio information.

SUMMARY

There is provided a method of controlling a base station for a headset, comprising: (i) receiving a real time digital signal; (ii) processing the real time digital signal to provide a control signal; and (iii) controlling the base station in response to the control signal; wherein the processing comprises: in succeeding time slots determining whether predefined signal content is present in the real time digital signal, increasing or decreasing a first value when predefined signal content is present and, respectively, decreasing or increasing the first value when predefined signal content is not present, and changing the control signal when the first value reaches a first target value.

In this way the first value gradually changes towards the first target value when content is present on the downstream link and gradually changes away from the first target value when content is not present. Thereby pauses or interruptions in a stream of content on the downstream link do not cause a restart of a process to control the downstream link. This is expedient for opening the downstream link via the control signal. Alternatively, for closing a downstream link, the first value gradually changes towards the first target value when content is not present on the downstream link and gradually changes away from the first target value when content is present. Thereby relatively short bursts of content do not prevent the downstream link from being closed.

In an embodiment, the upstream link is in accordance with the Universal Serial Bus, USB, standard. At least when the upstream link is in accordance with the USB standard and data transmitted on the upstream link are transmitted by a general purpose computer there is in general no message that sound is on its way, except in the form of the samples of the sound. Typically, samples of sound are conveyed on a USB compliant link in packets of 1 millisecond duration. Thus the determination of whether content is present can take place every millisecond.

The real time digital signal is a real time signal to the extent that data of the signal is buffered in a first-in-first-out manner, if buffered at all, only for short periods of time, so as not to degrade quality of speech conversation significantly—typically less than a few milliseconds.

In some embodiments the processing further comprises: increasing or decreasing a second value when predefined signal content is present and, respectively, decreasing or increasing the second value when predefined signal content is not present, and changing the control signal when the second value reaches a second target value.

Thereby, the control signal can be changed by two or more independent processes each with its own parameters defining values for increment and decrement step sizes, for the target value and for an initial value. One process can bring the control signal from a first state to a second, and another process can bring the control signal from the second state back to the first state or to a third state. For instance, one process can be assigned the task of bringing the downstream link from an open state to a closed state by changing the control signal and another process can be assigned the task of bringing the downstream link from a closed state to an open state.

In some embodiments the first and/or second value is increased by increments and decreased by decrements that have a mutual ratio of approximately 1:1 and where consecutive increments or decrements from an initial value makes the first and/or second value reach the target value in about 1.2 to 2.0 seconds or in about 1.6 seconds.

Thereby, when this process is applied to open the downstream link, sounds or other content with duration shorter than 1.2 to 2.0 or 1.6 seconds will not in itself open the downstream link. Such short sounds are frequently used to for 'beep' sounds to warn or notify a user of some event in a general purpose computer. Thus, annoying situations where the downstream link is opened and ready for conveying data content only when there is no content anymore are avoided—or at least the risk of those situations occurring is smaller. For example when increments or decrements are applied every millisecond decrements or increments of the value '−1' and '+1', an initial value of '0', and a target value of '1600' can give this result. However, other values can be assigned to give useful results.

In some embodiments the first and/or second value is increased by increments and decreased by decrements that have a mutual ratio of approximately 1:3 or 3:1 and where consecutive increments or decrements makes the first and/or second value reach the target value in less than about 4 to 8 seconds or in about 6 seconds.

Thereby, when this process is applied to close the downstream link, pauses or interruptions with duration shorter than about e.g. 6 seconds will not close the link. Thus, annoying situations where the link is closed e.g. during the period where a phone call connection is about to be established and where the phone is ringing at the other end are avoided—or at least the risk of those situations occurring is smaller. For example when increments or decrements are applied every millisecond decrements or increments of the value '−1' and '+3', an initial value of '6000', and a target value of '0' can give this result. However, other values can be assigned to give useful results.

In some embodiments the method comprises assigning the first value to an initial value, and resetting the first value to the initial value when the first value has reached the first target value.

Thereby, the method is ready for another run to change the control signal. When the first value has reached the first target value the control signal is also changed. The reset may take place at about the same time or later, but before the control signal is again to be changed the same way. Reset may be triggered by the control signal being changed or when the change that the control signal initiates has taken place or is about to have taken place.

In some embodiments, the method comprises controlling the base station to open or close a communication link in response to the control signal being changed.

Opening or closing a radio link takes time and thus involves a time delay from initiating a change of the radio link and until the change takes effect. The above method can implement a good trade-off between low power consumption and convenient operation in terms ensuring that the downstream link is open at the right time for transmission of data from the upstream link. The radio link may be in accordance with the Bluetooth (R) standard, Digital Enhanced Cordless Telecommunications (DECT) standard, or any other digital or analogue standard for radio communication.

In some embodiments the method comprises transmitting a radio signal by means of the base station and, in a battery operated headset device, receiving the radio signal and processing the radio signal to provide a headset control signal that controls battery power consumption of the headset.

Additionally, there is disclosed:

A base station comprising a receiver for a real time digital signal and a processor.

A data processing system having stored thereon program code means adapted to cause the data processing system to perform the steps of the above-mentioned method, when said program codes means are executed on the data processing system. Such a data processing system comprises e.g. a microprocessor with random access memory and/or an application-specific integrated circuit (ASIC).

A computer program product comprising program code means adapted to cause a data processing system to perform the steps of the above-mentioned method, when said program code means are executed on the data processing system.

A computer program product, comprising a computer-readable medium having stored thereon the program code means. The computer-readable medium is e.g. a CD-ROM, DVD, or a random access memory e.g. of the flash memory type.

A computer data signal embodied in a carrier wave and representing sequences of instructions which, when executed by a processor, cause the processor to perform the steps of the above-mentioned method. Such a computer data signal is e.g. a download signal communicated via the Internet.

DETAILED DESCRIPTION

Figure 1:
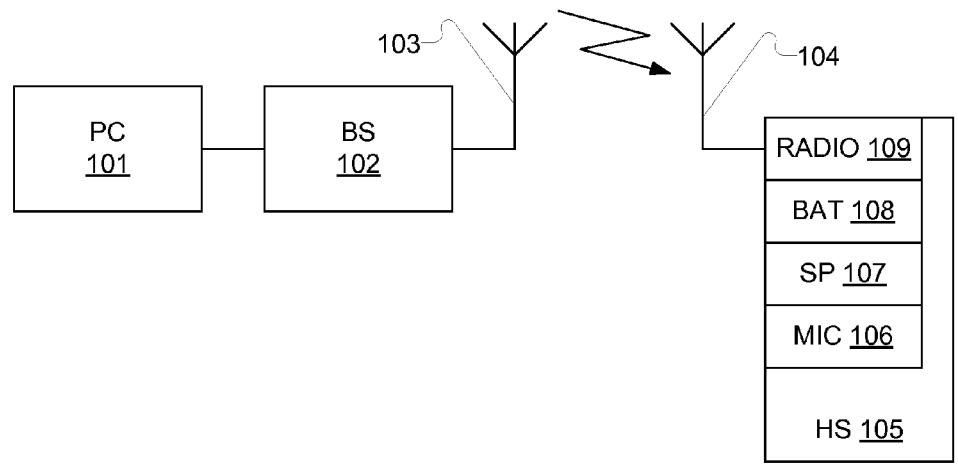
FIG. 1 shows a block diagram of a headset system.

FIG. 1 shows a block diagram of a headset system connected to a general purpose computer. The general purpose computer, PC 101, is e.g. of the personal computer type or any other type providing a suitable interface to a headset system comprising a base station, BS 102, and a headset, HS 105. In some embodiments the base station 102 is configured with a housing wherein electronic circuits for communicating with the PC 101 and the headset and for controlling the base station are accommodated. Also accommodated is an antenna 103 for communicating over a wireless link with the headset 105. The base station may be powered from the PC 101. In alternative embodiments the base station is embodied as a component of the PC 101.

The headset also comprises an antenna 104 connected to a radio transmitter/receiver 109, a battery pack 108 for supplying electrical power to the headset, a speaker 107 for playing audio data transmitted from the PC via the base station 102, and a microphone 106 for picking up sound signals and transmitting them back to the PC 101 via the base station 102.

The connection between the PC 101 and the base station is in general designated an upstream link and the connection between the base station 102 and the headset 105 is in general designated a downstream link.

Figure 2:
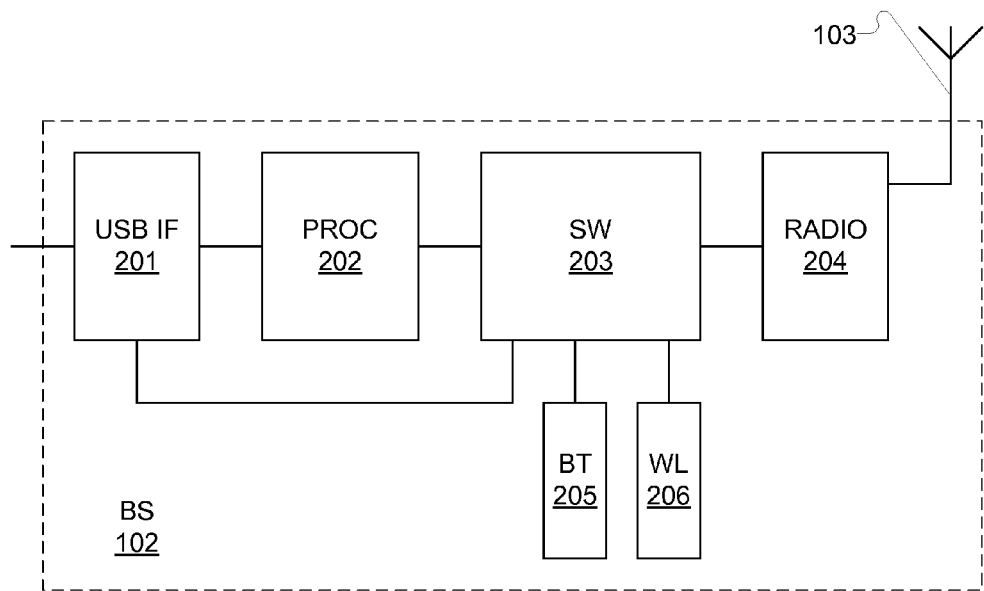
FIG. 2 shows a block diagram of a base station.

FIG. 2 shows a block diagram of a base station. The block diagram of the base station 102 shows in greater detail the functional components comprised by the base station. The base station comprises an interface, USB IF 201, for communicating with the general purpose computer, PC 101. In some embodiments this interface is a Universal Serial Bus, USB, compliant interface typically embodied as an integrated circuit. As mentioned above the link between the computer and the base station is also denoted an upstream link. The USB interface, 201 provides a real time digital signal in the form of packets of approximately 1 millisecond of digital samples of audio to a processor, proc 202. The processor 202 runs a method of controlling the downstream link via a control signal. The control signal controls the radio transmitter/receiver 204. The radio transmitter/receiver is controlled to transmit a predefined signal that causes the headset to respond in a predefined way e.g. to enter a normal mode where circuitry of the headset operates to receive and transmit audio or to enter a power saving mode where the circuitry of the headset is put in a hibernation state to save power. In some embodiments the radio transmitter/receiver is controlled simply by switching between a mode where a radio signal is present and another mode where a radio signal is not present.

Data received from the USB interface, 201 are transmitted to the headset 105 via the radio transmitter/receiver 204 and its antenna 103 and via a switch 203. The switch 203 is configured to receive data destined for the headset from other sources such as a source receiving data via a Bluetooth (R) interface, BT 205, or a conventional analogue or digital wired interface, WL 206. The signals arriving via these sources may affect the way the control signal controls the radio transmitter/receiver 204 and hence also the headset 105.

Figure 3:
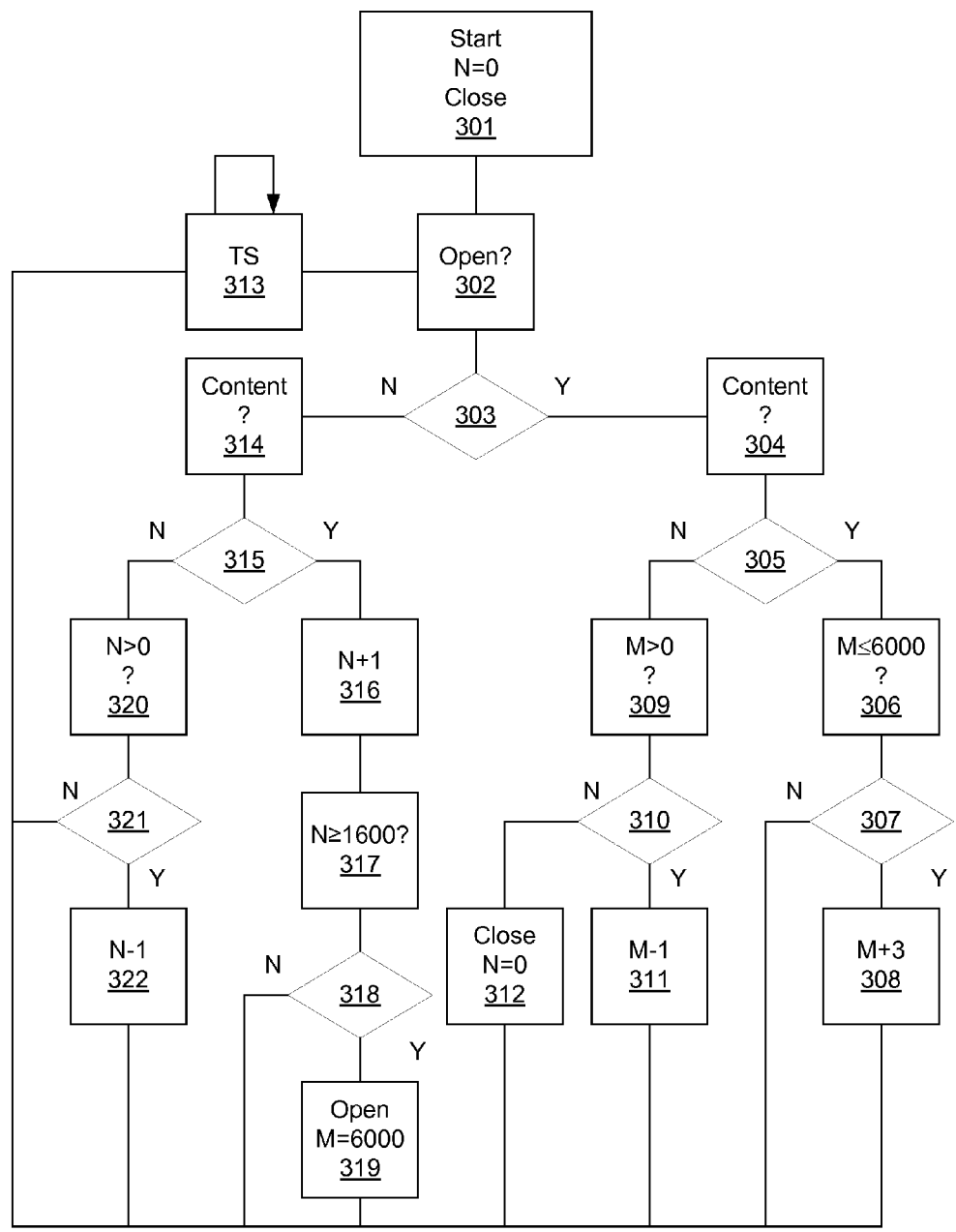
FIG. 3 shows a flow chart for a method of controlling the base station.

FIG. 3 shows a flow chart for a method of controlling the base station. The method is run by the processor 202 which is coupled to receive data from the upstream link. Generally, the method follows either one of two major paths depending on whether the downstream link is open or closed. The left hand side path of the flowchart controls opening of the downstream link whereas the right hand side path of the flowchart controls closing of the downstream link. Then at each major path the method follows either one of two minor paths depending on whether content is present or not to adjust a first and second counter value accordingly.

In an initial step 301, a first integer counter value N is set to an initial value N=0 and the control signal is set in a state to close the downstream link. In a subsequent step 302, it is examined whether the downstream link is open or not and in step 303 it is decided which route to follow.

If the downstream link is not open (N), i.e. closed, it is examined in step 314 whether content is present or not and the route of the method is decided in step 315 accordingly. If content is present (Y) the integer counter value N is incremented by 1 in step 316 to make the counter value approach the target value. If then in step 317 it is examined that the counter value N is greater than or equal to a target value of 1600 it is decided in step 318 to open the downstream link and set a second integer counter value M equal to an initial value of 6000 in step 319. The method will of course only reach step 319, where the downstream link is opened, after at least 1600 iterations. In case the counter value N has not reached the target value of 1600 the method proceeds to step 313 to wait for a next packet of data and wherefrom the method proceeds when a new packet arrives. If, instead, content is not present it is decided in step 315 to enter step 320, where it is examined whether the counter value N is greater than its initial value '0'. If this is the case it is decided in step 321 to decrement the counter N by subtracting 1 in step 322, whereby the counter value is adjusted away from the target value since no content was present. If the counter value N is not greater than '0', the method proceeds from step 321 to step 313 to wait for a new packet of data.

If the downstream link is open (Y), the method enters the right hand side path of the flowchart, and it is examined in step 304 if content is present If the downstream link is already open (Y) it is examined in step 304 whether content is present or not and the route of the method is decided accordingly in step 305. If content is present (Y), it is examined whether the second integer counter value M is less than or equal to the second target value 6000 i.e. if the target value has been reached. If M is less than or equal to 6000 (Y) it is decided in step 307 to increase M by an increment of 3 in step 308. Otherwise, if M is not less than or equal to 6000 the method resumes at step 313 to wait for the next packet. Contrary, if content is not present (N) it is examined if the second counter M is greater than 0 and in the affirmative case (Y) it is decided in step 310 to decrement the second counter by subtracting M by 1 in step 311. This represents the case where the second counter is decremented away from the target value since no content is present. If M is equal to 0 the downstream link is closed and the first integer value is reset to its initial value N=0 in step 312.

In the above the downstream link is opened or closed by changing a control signal. From this control signal being changed it takes some time before the change actually takes place.

Determining whether content is present can be performed in various ways e.g. by examining whether any packets has arrived on the upstream link or by examining the values of any samples in a packet.

Figure 4A:
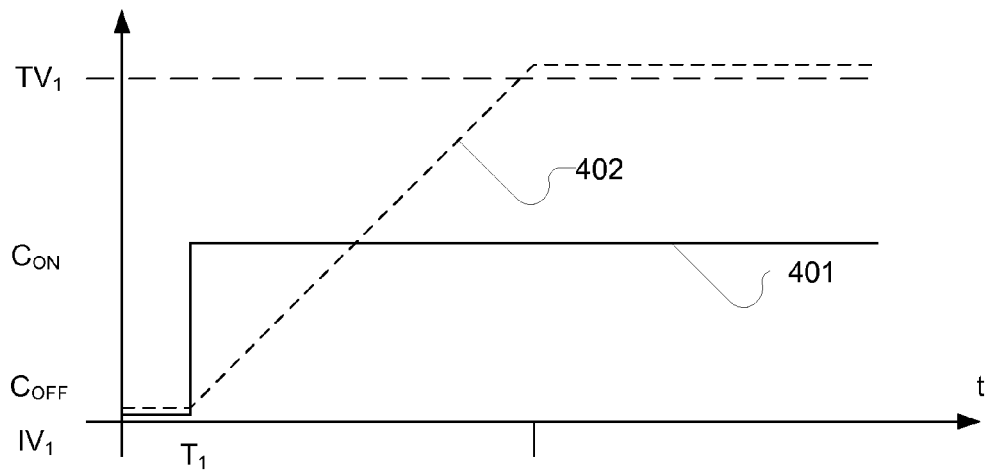
FIG. 4a, 4b, 4c illustrates a method of opening a communications link.
Figure 4B:
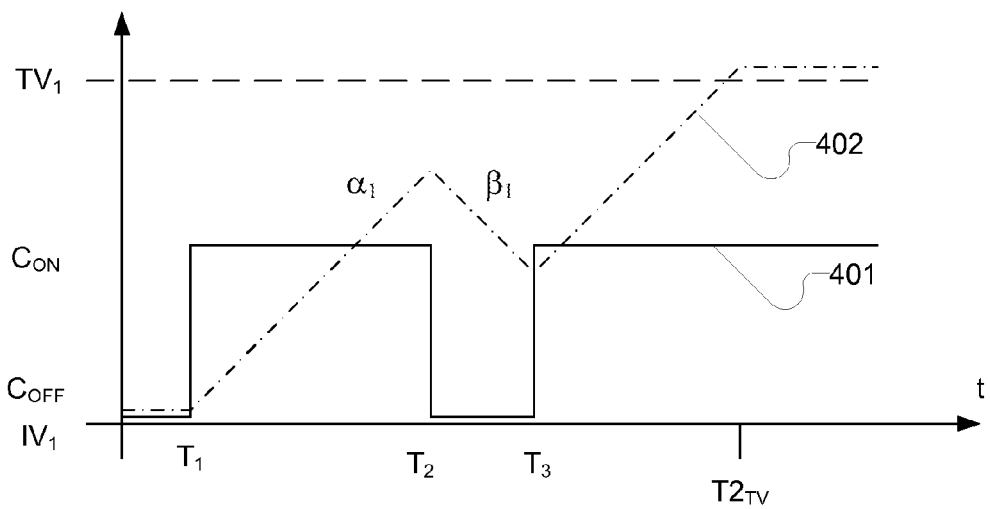
Figure 4C:
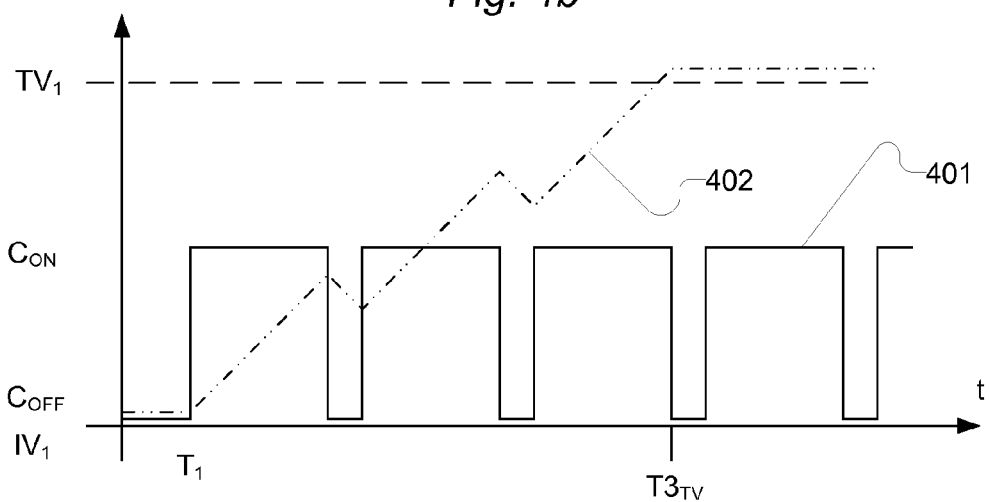

FIG. 4a, 4b, 4c illustrates a method of opening a communications link. It is shown when content is present as a function of time, t, by the curve 401 (shown as an unbroken line), where $C_{ON}$ designates that content is present and $C_{OFF}$ designates that content is not present. The first counter value is shown as curve 402 as a function of time, t, as illustrated by the dashed line. The counter starts from an initial value $IV_1$.

In the situation illustrated in FIG. 4a, content starts to arrive at time $t=T_1$ and remains present for an uninterrupted period of time. Consequently, the first counter value is monotonously increased until it reaches the first target value $TV_1$ at time $t=T1_{TV}$.

In the situation illustrated in FIG. 4b, content starts to arrive also at time $t=T_1$, but remains present only for a shorter uninterrupted period of time until $t=T_2$. Then content is not present until $t=T_3$ where content starts to arrive again. Consequently, the first counter value reaches the target value $TV_1$ only at a later point in time $T1_{TV}$, which is later than $T2_{TV}$ since the counter value is decremented while content is not present.

In the situation illustrated in FIG. 4c, content starts to arrive again at time $t=T_1$, but remains present only for shorter periods of time interrupted by quiescent periods of time with no content arriving. It can be seen that the first counter value is increased when content is present and decreased when content is not present.

The time it takes before the link is opened is thus dependent on the amount of time where content is arriving or is present relative to the amount of quiescent time, where content is not arriving or is present.

Generally, for opening the link, the increments are performed in steps $\alpha_1$ whereas decrements are performed in steps of $\beta_1$, where $\alpha_1$ and $\beta_1$ are integers of the same value. However, the values can be different to weigh periods with content and quiescent periods differently.

Figure 5A:
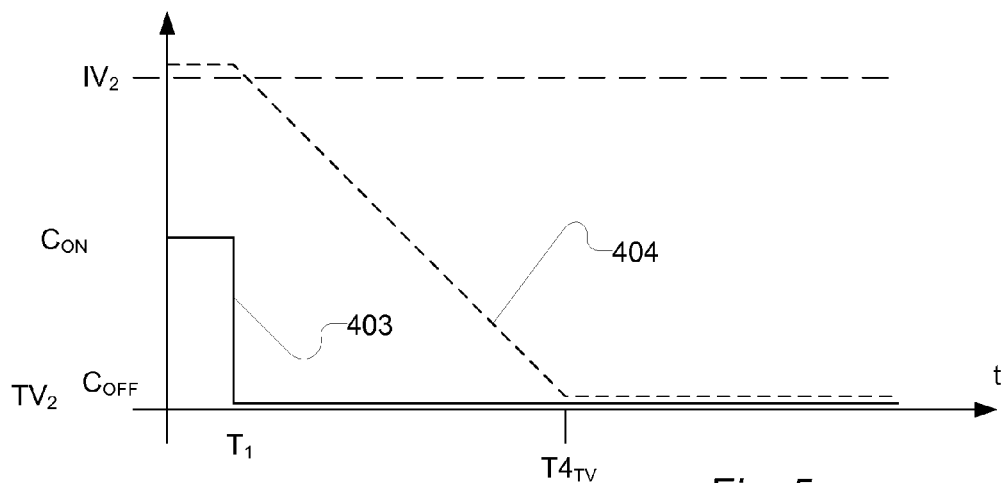
FIG. 5a, 5b, 5c illustrates a method of closing a communications link.
Figure 5B:
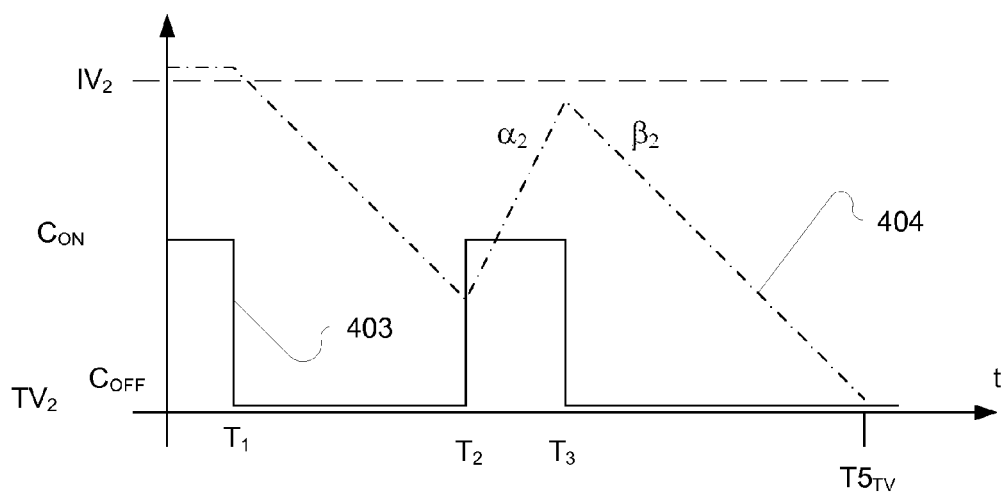
Figure 5C:
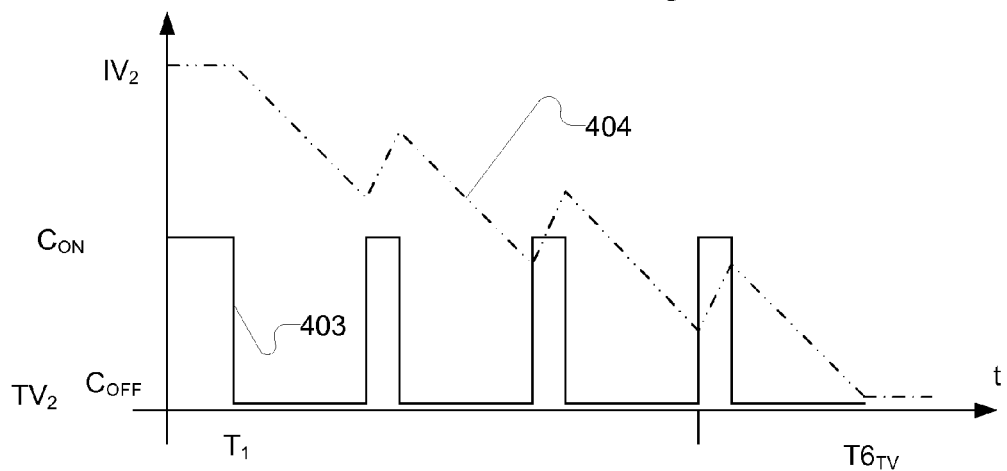

FIG. 5a, 5b, 5c illustrates a method of closing a communications link. It is shown when content is present as a function of time, t, by the curve 403 (shown as an unbroken line), where $C_{ON}$ designates that content is present and $C_{OFF}$ designates that content is not present. The second counter value is shown as curve 404 as a function of time, t, as illustrated by the dashed line.

In the situation illustrated in FIG. 5a, content stops to arrive at time $t=T_1$ and remains quiescent for a continuous period of time. Consequently, the second counter value is monotonously decreased from its initial value $IV_2$ until it reaches the second target value $TV_2$ at time $t=T4_{TV}$.

In the situation illustrated in FIG. 5b, content stops arriving also at time $t=T_1$, but remains quiescent only for a shorter period of time until $t=T_2$, where content starts to arrive again and arrives until $t=T_3$ where yet a quiescent period starts. Consequently, the second counter value reaches the target value $TV_2$ only at a later point in time $T5_{TV}$, which is later than $T4_{TV}$ since the counter value is incremented while content is present.

In the situation illustrated in FIG. 5c, content stops to arrive at time $t=T_1$, but remains present only for shorter periods of time interrupted by longer quiescent periods of time with no content arriving. It can be seen that the second counter value is increased when content is present and decreased when content is not present.

Generally, for closing, the increments are performed in steps $\alpha_2$ whereas decrements are performed in steps of $\beta_2$, where $\alpha_2$ and $\beta_2$ may be integers of different values e.g. in the ratio 3 to 1 (3:1).

The invention may also be implemented in systems using other personal audio communication devices than a headset such as a speakerphone or a set of wireless headphones. The data port used on a PC for connecting to the base unit or dongle may in stead of the USB port be any other suitable port.

The invention claimed is:

1. A method of controlling a communications channel between a base station and a self powered headset, comprising:
   receiving a real time digital signal;
   processing the real time digital signal to provide a control signal; and
   controlling said base station in response to the control signal;
   wherein the processing comprises:
      in succeeding time increments, determining whether predefined signal content is present in the real time digital signal, and for such time increments for which a signal is present, increasing a first count value by a predetermined number and, respectively, for such time increments for which a signal is not present decreasing the first count value, and changing the control signal to activate said headset when the first count value reaches a first target count value.

2. A method according to claim 1, where the processing further comprises:
   increasing a second count value when predefined signal content is present and, respectively, decreasing the second value when predefined signal content is not present, and changing the control signal when the second count value reaches a second target value.

3. A method of controlling a communications channel, comprising:
   receiving a real time digital signal;
   processing the real time digital signal to provide a control signal; and
   controlling a base station in response to the control signal; characterized in that the processing comprises:
      in succeeding time slots determining whether predefined signal content is present in the real time digital signal, increasing or decreasing a first value when predefined signal content is present and, respectively, decreasing or increasing the first value when predefined signal content is not present, and changing the control signal when the first value reaches a first target value and wherein the first or second value is increased by increments and decreased by decrements that have a mutual ratio of approximately 1:1 and where consecutive increments or decrements from an initial value makes the first and/or second value reach the target value in about 1.2 to 2.0 seconds or in about 1.6 seconds.

4. A method of controlling a communications channel, comprising:
   receiving a real time digital signal;
   processing the real time digital signal to provide a control signal; and
   controlling a base station in response to the control signal; characterized in that the processing comprises:
      in succeeding time slots determining whether predefined signal content is present in the real time digital signal, increasing or decreasing a first value when predefined signal content is present and, respectively, decreasing or increasing the first value when predefined signal content is not present, and changing the control signal when the first value reaches a first target value and wherein the first and/or second value is increased by increments and decreased by decrements that have a mutual ratio of approximately 1:3 or 3:1 and where consecutive increments or decrements from an initial value makes the first and/or second value reach the target value in about 4 to 8 seconds or in about 6 seconds.

5. A method according to claim 1, comprising:
   assigning the first value to an initial value, and
   resetting the first value to the initial value when the first value has reached the first target value.

6. A method according to claim 1, comprising controlling the base station to open or close a communication link in response to the control signal being changed.

7. A method according to claim 6, comprising transmitting a radio signal by means of the base station and, in a battery operated headset device, receiving the radio signal and processing the radio signal to provide a headset control signal that controls battery power consumption of the headset.

8. A non transitory computer usable program code containing program code adapted to cause the data processing system to perform the steps of the method according to claim 1, when said program codes means are executed on the data processing system.

9. A non-transitory computer program product comprising program code means adapted to cause a data processing system to perform the steps of the method according to claim 1, when said program code means are executed on the data processing system.

10. A non-transitory computer program product according to claim 9, comprising a computer-readable medium having stored thereon the program code means.

11. A non transitory computer usable program code containing program code when executed by a processor, cause the processor to perform the steps of the method according to claim 1.

12. A base station for use with a self powered headset, comprising:
   a receiver configured to receive a real time digital signal;

a processor configured to receive the real time digital signal, provide a control signal, and to control the base station in response to the control signal;

wherein the processor is configured to:

in succeeding time increments, determining whether predefined signal content is present in the real time digital signal, and for such time increments for which a signal is present incrementing, either positively or negatively a first count value when predefined signal content is present and, respectively, for such time increments for which a signal is not present incrementing, opposite of when said signal is present, the first count value when predefined signal content is not present, and changing the control signal when the first count value reaches a first target value.

13. A base station according to claim 12, where the processor further is configured to increase or decrease a second value when predefined signal content is present and, respectively, decrease or increase the second value when predefined signal content is not present, and change the control signal when the second value reaches a second target value.

14. A base station according to claim 12, where the first and/or second value is increased by increments and decreased by decrements that have a mutual ratio of approximately 1:1 and where consecutive increments or decrements makes the first and/or second value reach the target value in less than about 1.6 seconds.

15. A base station according to claim 12, where the first and/or second value is increased by increments and decreased by decrements that have a mutual ratio of approximately 1:3 or 3:1 and where consecutive increments or decrements makes the first and/or second value reach the target value in less than about 6 seconds.

16. A base station according to claim 12, where the processor further is configured to:

assign the first and/or second value to an initial value, and reset the first and/or second value to the initial value when the first value has reached the first target value.

17. A base station according to claim 12, where the base station is controlled by the processor to open or close a communication link in response the control signal being changed.

* * * * *